United States Patent [19]

Hill

[11] 4,326,919
[45] Apr. 27, 1982

[54] NUCLEAR CORE ARRANGEMENT

[75] Inventor: Donald J. Hill, O'Hara Township, Allegheny County, Pa.

[73] Assignee: Westinghouse Electric Corp., Pittsburgh, Pa.

[21] Appl. No.: 143,240

[22] Filed: Apr. 24, 1980

Related U.S. Application Data

[63] Continuation of Ser. No. 829,703, Sep. 1, 1977, abandoned.

[51] Int. Cl.³ .................. G21C 19/20; G21G 1/02
[52] U.S. Cl. .......................... 376/267; 414/146; 376/236
[58] Field of Search .............. 176/17, 30, 33, 78; 414/146

[56] References Cited

U.S. PATENT DOCUMENTS

| | | | |
|---|---|---|---|
| 3,141,827 | 7/1964 | Iskenderian | 176/17 |
| 3,546,068 | 12/1970 | Schluderbery | 176/78 |
| 3,799,839 | 3/1974 | Fischer | 176/68 |
| 3,844,886 | 10/1974 | Crowther | 176/17 |
| 3,859,165 | 1/1975 | Radkowsky | 176/18 |
| 4,251,321 | 2/1981 | Crowther | 176/17 |

Primary Examiner—Donald P. Walsh
Attorney, Agent, or Firm—Edward L. Levine; Z. L. Dermer

[57] ABSTRACT

A method and arrangement for utilizing mixed oxide fuel in the core of a nuclear reactor controlled by rectilinearly movable control rod elements which decreases the maximum single control rod element worth in the core. Fuel elements containing the mixed oxide fuel are positioned at discrete core locations, particularly at those locations receiving high worth control rod elements, thereby decreasing the worth of those control elements.

8 Claims, 5 Drawing Figures

NUCLEAR CORE ARRANGEMENT

This is a continuation of application Ser. No. 829,703, filed Sept. 1, 1977, now abandon.

BACKGROUND OF THE INVENTION

1. Field of the Invention

This invention relates to nuclear reactors, and more particularly to reactor cores controlled by movable control rod elements and utilizing mixed oxide fuel.

2. Description of the Prior Art

The use of fissionable plutonium fuel in nuclear reactors, commonly referred to as mixed oxide fuel, is highly advantageous. Recycle of plutonium fuel produced during the fissioning of other nuclear fuels provides a useful energy resource. In this context, plutonium fuel or mixed oxide fuel refers to a combination of fissionable plutonium with other fissionable elements, such as a combination of $UO_2$ and $PuO_2$. For example, a typical combination includes uranium fuel having a U-235 concentration of approximately 0.2 to 1.1 percent by weight, and plutonium obtained from reprocessing burned uranium fuel (first recycle plutonium) having approximately a 4.2 weight percent concentration of plutonium. This invention, it will be seen, is applicable to nuclear cores whenever plutonium, of any significant concentration or type, is used, including plutonium from successive recycles.

The inherent characteristics of mixed oxide fuel, however, limit the use of the fuel because it results in increased reactor control requirements. Plutonium has a high absorption cross section, resulting in plutonium competition with the reactor control means, typically control rod elements, for absorption of neutrons. This competition results in a decrease in the worth of the control rod elements. Further, insertion of plutonium in a core produces an increased Doppler and moderator defect, requiring increased control requirements.

As a result of the increased control requirements and decrease in control rod element ability to control reactivity, reactor core designers have provided core arrangements based upon positioning the mixed oxide fuel away from the control rod elements. For example, reactors have been proposed including bundled rod fuel elements which position plutonium bearing fuel rods in the central regions of fuel elements surrounded on their periphery by control rod elements or bars. The peripheral fuel rods bear a more common nuclear fuel, such as uranium. Also proposed have been "checkerboard" arrangements wherein mixed oxide bearing fuel elements are placed adjacent uranium bearing elements. With such arrangements, the control rod elements are inserted only in the uranium bearing assemblies. More recent arrangements have been proposed which orient mixed oxide fuel only at the lower portions of a core having top mounted control rod elements. This results in the control rod elements being in the vicinity of the mixed oxide fuel a decreased amount of time.

These prior art designs, based upon separating the control rod elements or bars from the mixed oxide fuel, thereby disadvantageously limit the amount of plutonium that can effectively be used in a given core. Some have also required additional control rod elements, beyond those required for a primarily uranium bearing core, which is extremely costly.

Further, reactor control is critical from a safety viewpoint. Throughout the nuclear power generating industry extreme care has always been exercised to ensure conservative, redundant, and safe designs. A typical approach to reactor control design has been to assume that under postulated accident conditions, when insertion or scram of the control rod elements is necessary, the control rod element having the highest control element worth in terms of reactivity is stuck out of the core. The worth of the control rod elements in this configuration has been referred to as the "N minus one" (N−1) control element worth. This hypothetical condition, which serves as one basis for nuclear plant design, is used to minimize the possibility of an area of the core maintaining undesirable criticality with a control element stuck out of position.

It is therefore desirable to provide a core which alleviates these limitations heretofore brought about by plutonium or mixed oxide utilization. It is also desirable to increase the amount of plutonium that can be utilized in a given core, while increasing safety margins through decreasing the potential for detrimental effects under an accident condition.

SUMMARY OF THE INVENTION

This invention provides a core arrangement and method of fueling a nuclear reactor utilizing fissionable plutonium or mixed oxide fuel, typically as a combination of uranium and plutonium oxides. It particularly addresses those reactor types that use movable selectively positioned control rod elements as one form of reactor control.

The invention provides placement of bundled-rod fuel elements containing mixed oxide fuel in discrete core locations so as to minimize the reactivity worth of the highest worth control element in the N−1 configuration. Such placement can decrease the worth of the otherwise highest worth control element so that it still represents the highest control element worth, but at a lesser value, or so that another control element in a given core position becomes the control element of highest control element worth. This other element, however, would then have a lower worth than the previously highest worth control element in the N−1 configuration.

In contradistinction to the prior art, the invention provides for the intentional positioning of preselected mixed oxide bearing fuel elements in core locations such that those elements will receive a control element. The mixed oxide bearing elements furthermore are positioned to receive control elements of the highest worth when assumed stuck and unable to enter the core.

This radical departure from the prior art teachings results in increased mixed oxide utilization without unduly increasing the control apparatus and cost in a given reactor. It also increases safety margins by reducing the worth of the most reactive control element that can be stuck out of the core under accident conditions.

BRIEF DESCRIPTION OF THE DRAWINGS

The advantages, nature, and additional features of this invention will become more apparent from the following description taken in connection with the accompanying drawings, in which.

DESCRIPTION OF THE PREFERRED EMBODIMENTS

Figure 1:
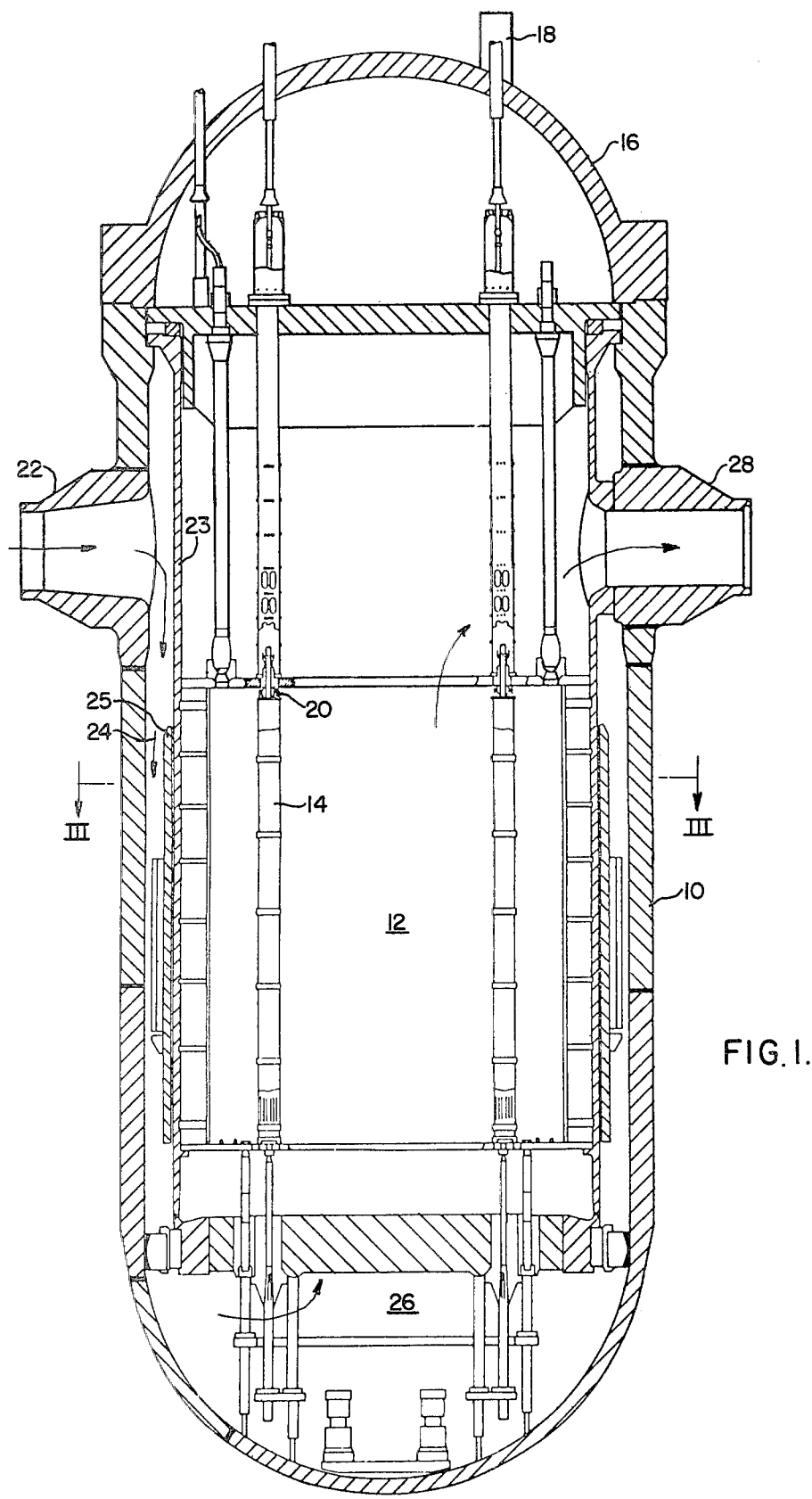
FIG. 1 is an elevation view, in section, of a typical nuclear reactor and internal structures.

Referring now to FIG. 1, there is shown a reactor vessel 10 housing a nuclear reactor core 12. The core 12 includes a plurality of parallel and coextending bundled-rod fuel elements 14, also known as fuel assemblies, supported vertically by structure within the vessel 10. The vessel 10 is sealed at the top by a head 16 from which there is supported control element drive mechanisms 18 which selectively position control elements 20 above and within some of the fuel elements 14. During operation a reactor coolant fluid, such as water, is typically pumped into the vessel through a plurality of inlet nozzles 22, passes downward through an annular region 24 between the vessel and a core barrel 23 and thermal shield 25, turns in the vessel lower plenum 26, passes upwardly through the core 12, and exits through a plurality of outlet nozzles 28. The heat energy which the core imparts to the coolant is transferred in heat transfer apparatus (not shown) typically for the ultimate purpose of electrical power generation.

Figure 2:
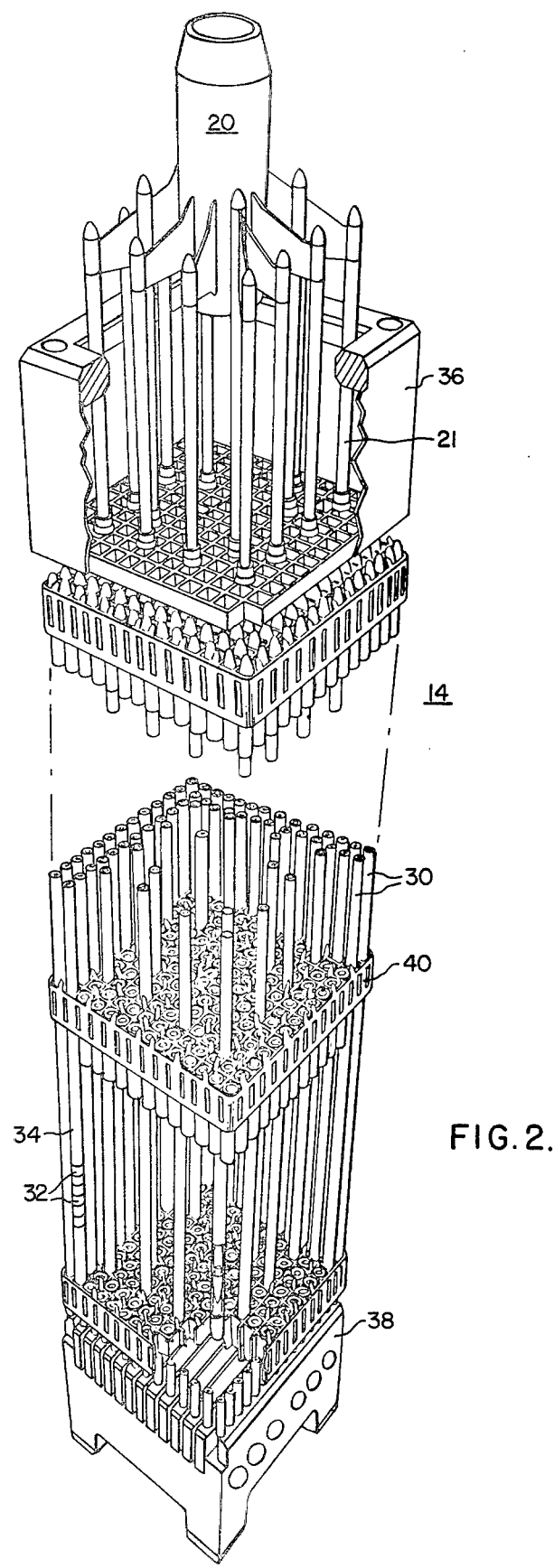
FIG. 2 is a perspective view of a typical bundled-rod nuclear fuel element receiving a control element of the spider type.

A typical fuel element 14 of the bundled-rod type is shown in greater detail in FIG. 2. It includes a plurality of parallel and coextending fuel rods 30, each of which includes nuclear fuel pellets 32 stacked within a sealed metallic cladding 34. The fuel rods 30 are primarily supported by upper 36 and lower 38 nozzles and by grid structures 40 spaced along the element length. The element is shown receiving a control element 20 of the "spider" type, including a plurality of cylindrical control rods 21, although plates, bars, singular rods, and so forth, can be used with varying element configurations. The control element 20 is comprised of a material having a high neutron absorption cross section, such as boron carbide, tantalum, a combination of silver-indium and cadmium, or many others well known in the art. It is to be understood that while an open-lattice or grid-type fuel element is shown, the teachings herein are applicable to other fuel element structures, including those referred to as ducted elements used in many reactor types, such as liquid metal cooled fast breeder reactors.

Figure 3:
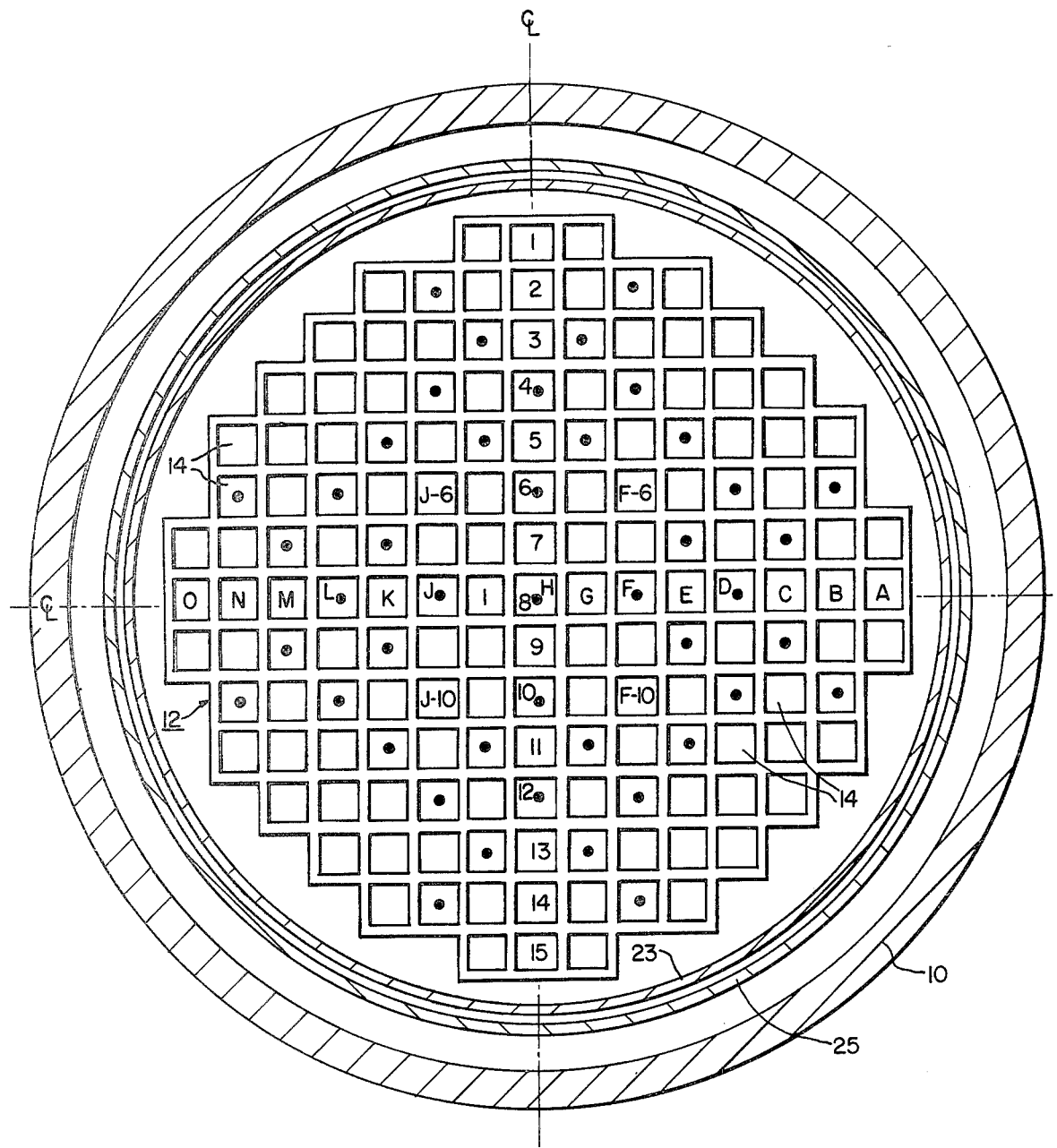
FIG. 3 is a simplified plan view, in partial section, taken at III—III of FIG. 1.

FIG. 3 shows that the fuel elements 14 are disposed in core locations in a regularly patterned array. The letters A through O and numerals 1 through 15 are herein utilized to reference a given core position (A-1, B-2, etc.). Typically cores 12 are symmetrically arranged in quadrants or other geometric configurations such that elements in locations, for example, J-6, J-10, F-6, and F-10 experience similar operating characteristics and compositions. A fuel element 14 is burned within a given core position for a period of time, and is then removed from, or reshuffled within, the core 12 during refueling operations. While a given fuel element 14 can reside in several core positions throughout its useful life, such as during three or more separate core cycles, the control element 20 positions are typically fixed. The control element positions in the exemplary core shown are depicted by the solid circles in the Figure. Typically, as shown, the control element positions are also symmetrically arranged.

The reactivity worth of the control elements 20 for a core 12 can be determined by calculational methods and devices well known in the art. The determinations can be performed by computer or other calculational means. Knowledge of individual and total control element reactivity worths is of vital importance in providing necessary core control means, such as the elements 20, as well as other neutron poisons and additionally in providing fluid moderator, flow rate, density and composition requirements. Although the basis for determination of, and the relative value of, total and individual control element worths is herein presented in relation to an all uranium core, it will be understood that such determinations can be made on other bases, such as an assumed mixed oxide and uranium core having uranium fuel elements at control rod positions.

The reactivity worth of the control elements 20 in a core 12 is typically discussed in terms of "total element worth" and "usable element worth." Throughout this description and the appended claims, "total control element worth" refers to the reactivity worth of all the control elements of a given reactor in a given core arrangement. "Useable control element worth" refers to the reactivity worth in the same reactor with the most reactive control element stuck out of the core. This is also referred to as the "N−1 control element worth," or the core in an "N−1 configuration." The N−1 configuration, with the most reactive control element assumed to be stuck out of the core, is the basis upon which core shutdown margin and reactor safety requirements are typically based. As core arrangements are typically symmetrical in two, four, eight, or other numbers of segments, the control element of highest worth can actually represent a plurality of control element positions, for example, two control elements in each of the four quadrants of the exemplary core 12, combining so as to provide eight symmetrical and substantially similar positions. For purposes of design and analysis, however, only one control element is assumed to be stuck.

The disadvantageous effect on control requirements when plutonium or mixed oxide fuel is introduced into a uranium or other type core 12 has in the past dictated that the mixed oxide fuel is in some manner separated or spaced from the control elements 20. This invention, however, provides for placement of mixed oxide bearing fuel elements 14 specifically in those positions which otherwise would have had the highest rod worths in an N−1 configuration. Preferably fuel elements bearing the highest mixed oxide or plutonium concentrations within a given core are so positioned. In the exemplary core having eight symmetrical locations, eight fuel elements are so positioned. This orientation decreases the stuck control element worth of the otherwise highest worth control element to a value which makes it no longer the highest worth control element, or which reduces its incremental worth to a value above the next highest worth control element, but less than its previous worth.

The following example will better provide a description of the advantages of the invention. It is to be understood, however, that the example is merely illustrative, and that the invention can effectively be practiced in many differing reactors and core arrangements, utilizing various quantities and combinations of plutonium fuel.

Figure 4:
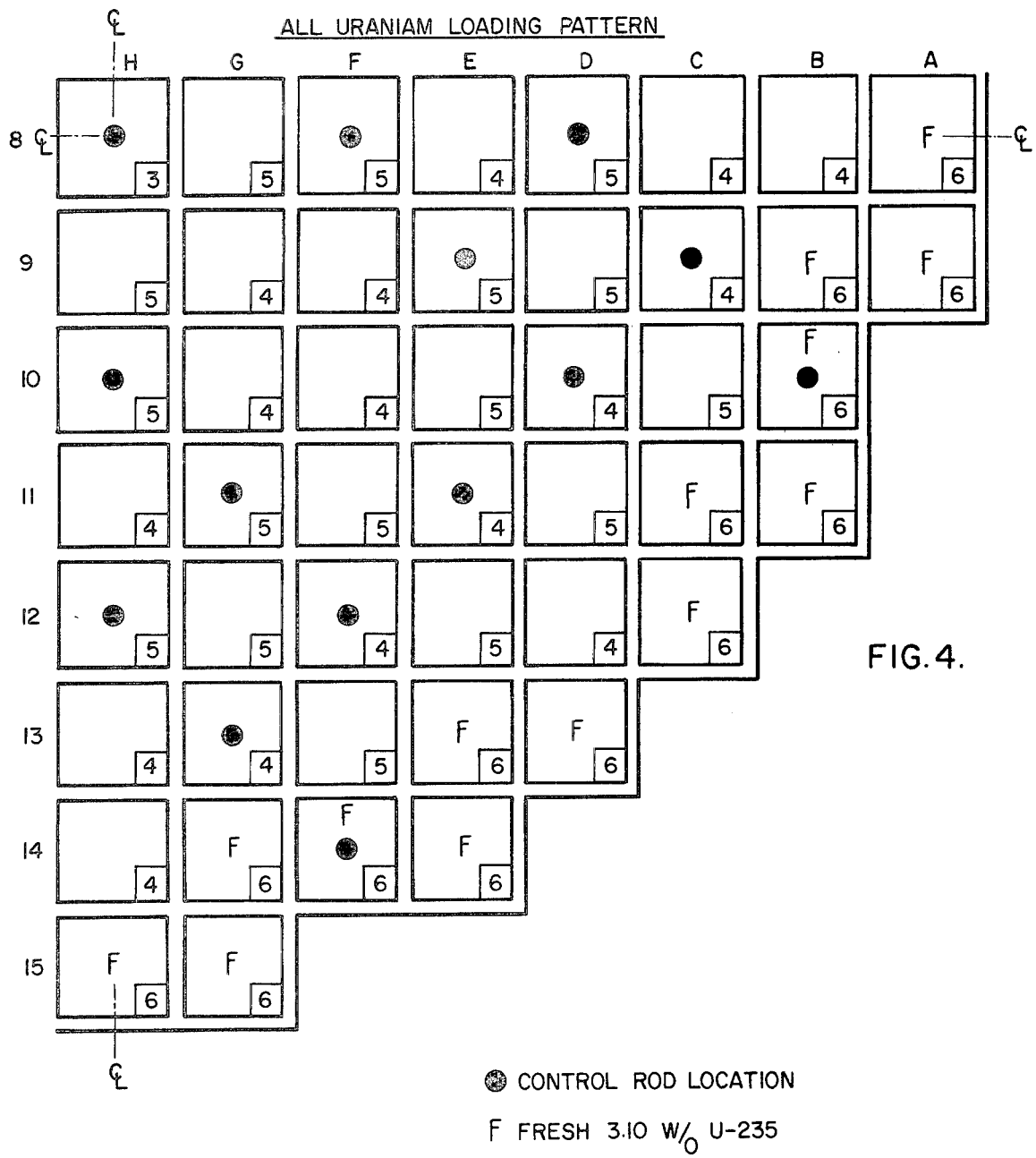
FIG. 4 is a schematic illustration of a core arrangement.

FIG. 4 shows the loading pattern for the exemplary all uranium core. The numerals in the box at the lower right of selected element positions identify the core regions. The locations identified as "5" identify those uranium bearing fuel elements 14 initially placed in the core in the fifth operating cycle; similarly those positions identified as "4" represent uranium fuel elements initially placed in the core in the fourth operating cycle. The letter "F" denotes fresh uranium bearing fuel elements. These fresh elements are initially inserted into the core in the sixth operating cycle. At this point in the core life, only fuel elements initially bearing uranium, as opposed to plutonium, have been utilized. Each fuel element ultimately resides in the core in three different positions, and for three operating cycles, with minor exceptions. It will be understood, however, that the invention can beneficially be applied to core arrangements having any number of fuel regions with fuel elements inserted for any number of operating cycles.

Table I lists the usable control element worth and the stuck control element worth for each control element receiving core position for the all-uranium core of FIG. 4. The table is based upon hot full power conditions at the end of life (EOL).

TABLE I

| Core Configuration | Usable Control Element Worth %Δρ | Individual Stuck Control Element Worth %Δρ |
|---|---|---|
| N-1 Control Elements In | | |
| Element E-11 Stuck Out | 6.41 | 0.90 |
| Element B-10 Stuck Out | 5.96 | 1.35 |
| Element H-08 Stuck Out | 7.20 | 0.11 |
| Element F-08 Stuck Out | 7.28 | 0.03 |
| Element D-08 Stuck Out | 7.25 | 0.06 |
| Element E-09 Stuck Out | 7.27 | 0.04 |
| Element C-09 Stuck Out | 6.63 | 0.68 |
| Element D-10 Stuck Out | 6.77 | 0.54 |

From Table I it can be seen that the control element located in position B-10 is the most reactive control element stuck out of the core. This conclusion also applies to the seven other control rods at locations symmetric with B-10 in the exemplary core (F-14, J-14, N-10, N-6, J-2, F-2, and B-6).

Figure 5:
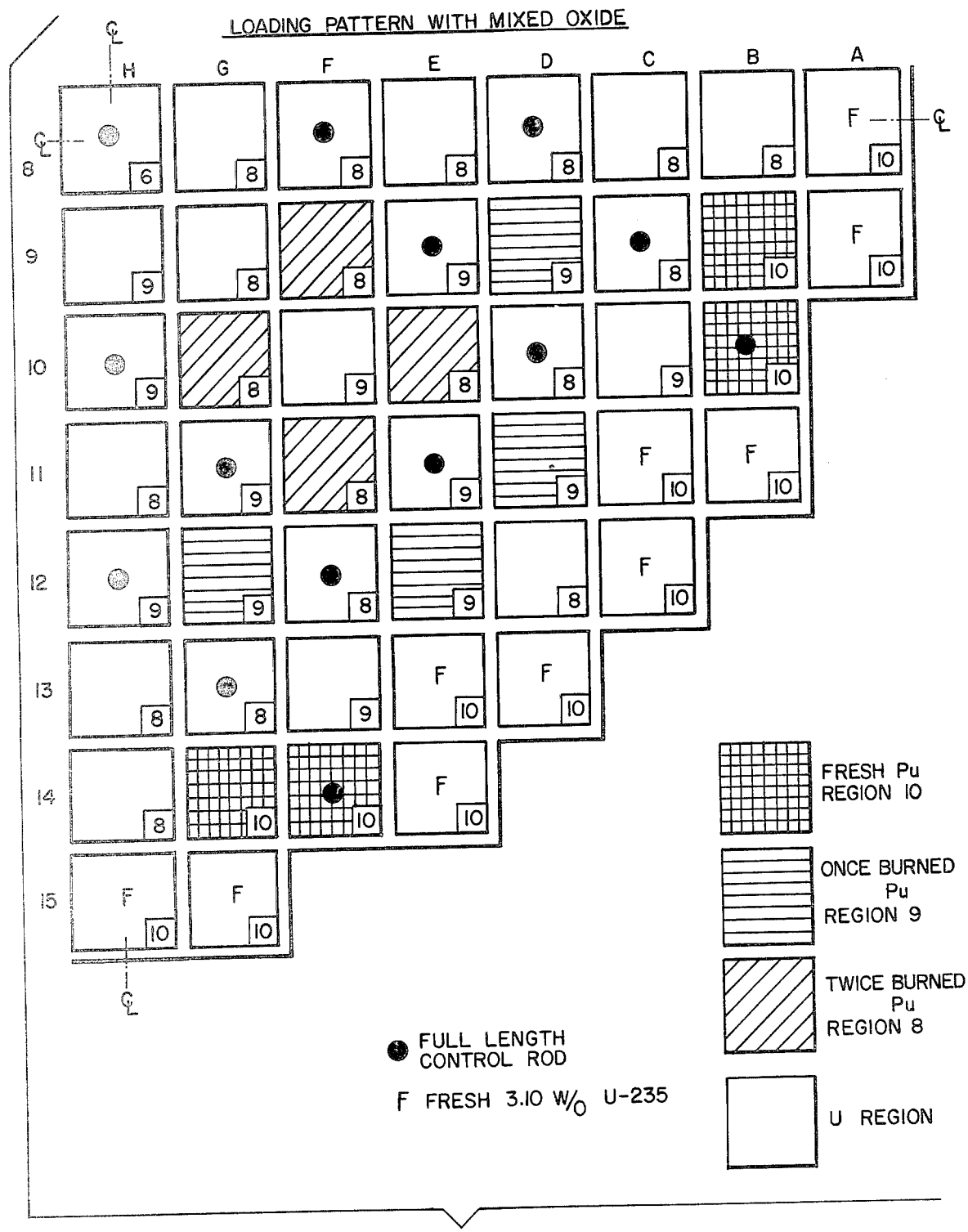
FIG. 5 is another schematic of another core arrangement.

FIG. 5 shows the loading pattern of the core of FIG. 4 after a number of operating cycles. Specifically, the all-uranium core of FIG. 4 had been burned, and in the next operating cycle, some all-uranium and some mixed oxide plutonium bearing elements had been loaded into the core. The core was operated, the fuel burned, and then a new region of some plutonium and some all-uranium elements were inserted. This was continued to the point shown in FIG. 5 and identified by the identification blocks noted thereon. Accordingly, the core locations without hatching represent fuel elements bearing uranium fuel as opposed to mixed oxide fuel, when initially inserted into the core. Those identified as "8" have been burned twice; those identified as "9" have been burned once, and those identified as "10" and "F" are fresh at the beginning of the cycle. The nomenclature similarly identifies those fuel elements comprising mixed oxide fuel when initially placed in the core. The mixed oxide elements have also been identified by cross hatching.

As shown in FIG. 5, mixed oxide plutonium bearing fuel elements have been deliberately positioned at core location B-10 and the 7 other symmetric locations, including location F-14. In particular, fresh plutonium bearing elements have been so positioned.

Table II lists the usable control element worth and the stuck control element worth for each control rod-receiving-core-position for the core of FIG. 5. Table II is also based upon hot full power conditions at end of life, i.e., after operating the FIG. 5 core.

TABLE II

| Core Configuration | Usable Control Element Worth %Δρ | Individual Stuck Control Element Worth %Δρ |
|---|---|---|
| N-1 Control Elements In | | |
| Element E-11 Stuck Out | 6.06 | 0.96 |
| Element B-10 Stuck Out | 6.09 | 0.93 |
| Element H-08 Stuck Out | 6.94 | 0.06 |
| Element F-08 Stuck Out | 6.97 | 0.05 |
| Element D-08 Stuck Out | 6.91 | 0.11 |
| Element E-09 Stuck Out | 6.95 | 0.07 |
| Element C-09 Stuck Out | 6.36 | 0.66 |
| Element D-10 Stuck Out | 6.47 | 0.55 |

From Table II it can be seen that the worth of the previously most reactive stuck control element position, B-10, has been decreased from 1.35% ΔP for the all-uranium core to 0.93% ΔP for the mixed oxide core. It can also be noted that the worth of the control element at core locations E-11, and for any symmetric location, has increased from 0.90% ΔP to 0.96% ΔP. Consequently, this element (E-11) is now the most reactive rod potentially stuck out of the core at hot full power conditions. Its N−1 worth, however, is substantially less than that of the rod at position B-10 in the all-uranium core. It should be noted that beneficial application of the invention need not be limited to only the most reactive stuck control element position. For example, placement of mixed oxide fuel in position E-11, in addition to position B-10, will further decrease the highest individual stuck control element worth in the core. Although the incremental benefit to be obtained from such successive plutonium placement is, in this example, rather small, in other core configurations the benefits can be substantial. It will further be seen that there is, at hot full power conditions, a relatively slight difference between the worth of the control element located at position E-11 and the worth of the control element located at position B-10. However, at hot zero power conditions, the point at which shutdown margin is typically determined, this condition changes.

Table III present a summary of control element worths at hot zero power conditions for the exemplary all-uranium core arrangement and the mixed core arrangement.

TABLE III

| Core Configuration | Control Element Worth in Core %Δρ | | Stuck Control Element Worth %Δρ |
|---|---|---|---|
| All Uranium Core EOL Cycle, HZP | | | |
| All Control Elements In | Total - | 6.95 | — |
| N-1 Control Elements | | | |
| Element E-11 Stuck Out | N-1 - | 6.26 | 0.69 |
| Element B-10 Stuck Out | N-1 - | 5.59 | 1.36 |
| Core with 48 Pu Fueled Assemblies at EOL Cycle, HZP | | | |
| All Control Elements In | Total - | 6.79 | — |
| N-1 Control Elements | | | |
| Element E-11 Stuck Out | N-1 - | 5.86 | 0.93 |
| Element B-10 Stuck Out | N-1 - | 5.86 | 0.93 |

From Table III it can be seen that the N−1 control element worth of the operative control elements for the mixed oxide arrangement increases relative to the all-uranium core where a mixed oxide fuel element is used at the N−1 core location, (It should be noted that it is merely coincidental in this example that the N−1 control element worths for E-11 both element and element B-10 stuck out of the core are identical.) Thus, by deliberately placing plutonium fuel at the most reactive stuck control element location as determined for the all-uranium core, the usable control element worth is considerably higher in the plutonium core. It can also be seen that while the usable control element worth has increased, the total control element worth has decreased.

Table IV presents a shutdown margin summary for the all uranium and the mixed oxide core arrangements. It includes parameters typically included in a shutdown margin analysis.

TABLE IV

| Item | EOL Cycle 10, All U Core Shutdown Margin, %Δρ | EOL Cycle 10, Mixed Oxide Core Shutdown Margin %Δρ |
| --- | --- | --- |
| Control Requirements | | |
| Power Defect | 1.78 | 1.86 |
| Redistribution | 0.85 | 0.85 |
| Void | 0.05 | 0.05 |
| Maneuvering Band & Bite | 0.30 | 0.30 |
| Total Requirements | 2.98 | 3.06 |
| Control Element Worths | | |
| N-1 Element Worth | 5.59 | 5.86 |
| Less Uncertainty | 5.03 | 5.27 |
| 10% uncertainty for U core | | |
| 13% uncertainty for core with Pu fuel | | |
| Steambreak Shutdown Requirement | 1.72 | 1.69 |
| Excess Shutdown Margin | 0.33 | 0.52 |

From Table IV it can be seen that the power defect, which is the sum of the Doppler and moderator defect, did increase in the mixed oxide core. However, the worth of all conrol elements in the core with the most reactive element stuck out of the core with or without conservative uncertainties, is still higher than the all uranium core. In addition, by utilizing mixed oxide fuel at the most reactive control element position, the reactivity required to remain subcritical, for example, in an assumed steambreak accident, is actually reduced. It can also be seen from Table IV that by taking the N−1 control element worth, less conservative uncertainties, less control requirements, less the steam-break shutdown requirement, that the all uranium core has an excess shutdown margin of 0.33% in reactivity while the plutonium core has an excess shutdown margin of 0.52% in reactivity. Thus, the plutonium fuel core has approximately 0.2% ΔP more shutdown margin than the all uranium core.

It should also be noted that in certain core configurations a fuel element having the highest plutonium concentration among the core elements would not be placed at a control element position. Other factors must be considered including, for example, the effect upon core power distribution. In the exemplary core arrangement the control element at position B-10, having the highest stuck element worth, is located in the peripheral core region which typically receives fresh, or unburned, fuel elements. Had the highest stuck control element worth control element been in, for example, the intermediate core region (region 9 of FIG. 5), a once-burned plutonium-bearing fuel element would be positioned to receive the control element. If a fresh mixed oxide fuel element were placed in the intermediate region it could result in an excess of reactivity in that position causing local power peaking.

While the benefits to be achieved from utilization of this invention have been illustrated through use of a singular example, it will be apparent that the teaching can be equally applied to many reactor and core types and arrangements. It therefore is to be understood that within the scope of the appended claims, the invention may be practiced other than as specifically described.

I claim:

1. A method of fueling a nuclear reactor having discrete core positions, each position receiving a singular vertically disposed bundled-rod fuel assembly, each said fuel assembly including a plurality of fuel rods having nuclear fuel disposed within a metallic cladding, at least some of said fuel assemblies bearing fissionable plutonium nuclear fuel and at least some other of said assemblies bearing fissionable nuclear fuel essentially free of fissionable plutonium upon initial insertion into said core, said reactor further having rectilinearly movable control elements, the number of control elements being less than the number of fuel assemblies, each said control element being insertable into a selected one of said fuel assemblies in a corresponding one of said core positions, each said control element, upon insertion, being laterally bounded by said fuel assembly, said method comprising;
 (a) inserting a plutonium bearing fuel assembly into one of said selected control element receiving core positions, said position being the position of highest control element worth in the N−1 configuration based upon a core configuration having only fuel assemblies essentially free of fissionable plutonium; and
 (b) inserting said plutonium bearing fuel assemblies and said fuel assemblies essentially free of fissionable plutonium into the remaining core positions.

2. A core arrangement for a nuclear reactor utilizing fissionable plutonium bearing fuel and having a plurality of discrete core positions, each position receiving a singular vertically disposed fuel assembly, each said fuel assembly including a plurality of fuel rods having nuclear fuel disposed within a metallic cladding, at least some of said fuel assemblies bearing fissionable plutonium nuclear fuel and at least some other of said assemblies bearing fissionable nuclear fuel essentially free of fissionable plutonium upon initial insertion into said core, said reactor further having rectilinearly movable control elements, each said control element being insertable into one of said fuel assemblies in a corresponding core position, said control element, upon insertion, being laterally bounded by said fuel assembly, the number of control elements being less than the number of fuel assemblies, comprising:

(a) a plurality of said plutonium bearing fuel assemblies disposed respectively in a plurality of said core positions;

(b) a plurality of said fuel assemblies essentially void of fissionable plutonium fuel disposed respectively in another plurality of said core positions; and (c) at least one plutonium bearing fuel assembly disposed in the discrete control element receiving core position having the highest control element worth in the N−1 configuration based upon a core configuration having only fuel assemblies essentially free of fissionable plutonium.

3. A method of fueling a nuclear reactor core having discrete core positions, each position receiving a singular vertically disposed bundled-rod fuel assembly, each said fuel assembly including a plurality of fuel rods having nuclear fuel disposed within a metallic cladding, said core being controlled by rectilinearly insertable control elements, the number of control elements being less than the number of fuel assemblies, each said control element being insertable into one of said fuel assemblies, each said control element, upon insertion, being laterally bounded by said fuel assembly, some of said fuel assemblies having fissionable material consisting essentially of uranium and being essentially free of plutonium, and some other of said fuel assemblies having fissionable plutonium fuel, said method comprising:

(a) determining the control element receiving core position having the highest reactivity in the N−1 configuration based upon a core configuration having only uranium bearing fissionable fuel assemblies essentially free of fissionable plutonium;

(b) inserting a plutonium bearing fuel assembly in said determined position; and (c) inserting said other plutonium bearing fuel assemblies and said uranium bearing fuel assemblies initially essentially free of plutonium into the balance of said core.

4. A nuclear reactor comprising:

(a) a reactor vessel having a head;

(b) a plurality of rectilinearly movable control elements vertically insertable into said vessel from said head;

(c) a plurality of vertical coextending bundled-rod fuel assemblies positioned within said vessel in discrete core positions, each said position receiving a corresponding one of said fuel assemblies, each said fuel assembly including a plurality of fuel rods having nuclear fuel disposed within a metallic cladding, at least some of said fuel assemblies bearing fissionable plutonium nuclear fuel and at least some other of said assemblies bearing fissionable nuclear fuel essentially free of fissionable plutonium upon initial insertion into said core, the number of fuel assemblies being greater than the number of control elements, some of said fuel assemblies being sized and positioned to each removably receive and laterally bound one of said control elements, at least one of said control element receiving fuel assemblies being a plutonium bearing assembly and being positioned at the position of the highest N−1 control element worth based upon a core configuration having only fuel assemblies essentially free of fissionable plutonium upon initial insertion into said core.

5. A core for a nuclear reactor controlled by selectively positionable vertically disposed control elements, said core comprising a plurality of discrete core positions, each position receiving a singular vertical bundled-rod fuel assembly, each said fuel assembly including a plurality of fuel rods having nuclear fuel disposed within a metallic cladding, at least some of said fuel assemblies bearing fissionable plutonium nuclear fuel and at least some other of said assemblies bearing fissionable nuclear fuel essentially free of fissionable plutonium upon initial insertion into said core, some of said fuel assemblies sized and positioned to removably receive and laterally bound a corresponding one of said control elements, one of said control element receiving fuel assemblies including fissionable plutonium fuel being disposed at a preselected one of said discrete core positions so as to decrease the worth of the control element otherwise having the highest control element worth in the N−1 configuration based upon a core configuration having only fuel assemblies essentially free of fissionable plutonium upon initial insertion into said core.

6. A method of fueling a nuclear reactor having discrete core positions, each position receiving a singular vertically disposed fuel assembly, each said fuel assembly including a plurality of fuel rods having nuclear fuel disposed within a metallic cladding, said reactor further having rectilinearly movable control elements, the number of control elements being less than the number fuel assemblies, each said control element being insertable into a selected one of said fuel assemblies in a corresponding one of said core positions, each said control element, upon insertion, being laterally bounded by said fuel assembly, said method comprising:

(a) inserting an early cycle fuel assembly into each said core position, each said early cycle fuel assembly bearing fissionable nuclear fuel essentially free of plutonium;

(b) determining a fuel assembly loading pattern whereby a fractional part of said early cycle assemblies are to be removed from said core, at least some of the remaining assemblies are to be shuffled to different positions within said core and new fuel assemblies are to be inserted into the remaining fractional part of said core, some of said new fuel assemblies to bear fissionable plutonium nuclear fuel and some other of said new fuel assemblies to bear fissionable nuclear fuel essentially free of plutonium upon initial insertion into said core;

(c) analyzing said loading pattern to decide the control rod receiving core position of highest worth in the N−1 configuration;

(d) inserting one of said plutonium bearing fuel assemblies into said decided position; and (e) shuffling and inserting assemblies in accordance with said loading pattern in all other positions.

7. A method of determining a fuel assembly loading pattern for a nuclear reactor having discrete core positions, each position receiving a singular vertically disposed fuel assembly, each said fuel assembly including a plurality of fuel rods having nuclear fuel disposed within a metallic cladding, said reactor further having rectilinearly movable control elements, the number of control elements being less than the number of fuel assemblies, each said control element being insertable into a selected one of said fuel assemblies in a corresponding one of said core positions, each said control element, upon insertion, being laterally bounded by said fuel assembly, said method comprising:
- (a) determining an early cycle fuel loading pattern whereby an early cycle fuel assembly is inserted into each said core position, each said early cycle fuel assembly bearing fissionable nuclear fuel initially essentially free of plutonium; then
- (b) determining the control element receiving core position of said early cycle fuel loading pattern which has the highest control element worth in the $N-1$ configuration, and then
- (c) determining a subsequent cycle fuel loading pattern whereby a subsequent cycle fuel assembly is inserted into each said core position, some of said subsequent cycle fuel assemblies to bear fissionable plutonium nuclear fuel, some other of said subsequent cycle fuel assemblies to bear fissionable nuclear fuel initially essentially free of plutonium, said subsequent cycle determination being based upon the criteria that a plutonium bearing fuel assembly is located at said determined position of highest control element worth in the $N-1$ configuration.

8. A method of fueling a nuclear reactor having discrete core positions, each position receiving a singular vertically disposed fuel assembly, each said fuel assembly including a plurality of fuel rods having nuclear fuel disposed within a metallic cladding, said reactor further having recilinearly movable control elements, the number of control elements being less than the number of fuel assemblies, each said control element being insertable into a selected one of said fuel assemblies in a corresponding one of said core positions, each said control element, upon insertion, being laterally bounded by said fuel assembly, said method comprising:

inserting fuel assemblies into said core in accordance with the determined subsequent cycle fuel loading pattern of claim 7.

* * * * *